(12) United States Patent
    Lau (10) Patent No.: US 9,963,649 B2
(45) Date of Patent: May 8, 2018

(54) HIGH TEMPERATURE AND PRESSURE SOLIDS HANDLING SYSTEM

(71) Applicant: Synthesis Energy Systems, Inc., Houston, TX (US)

(72) Inventor: Francis Sikming Lau, Darien, IL (US)

(73) Assignee: SYNTHESIS ENERGY SYSTEMS, INC., Houston, TX (US)

( * ) Notice: Subject to any disclaimer, the term of this patent is extended or adjusted under 35 U.S.C. 154(b) by 114 days.

(21) Appl. No.: 15/218,068

(22) Filed: Jul. 24, 2016

(65) Prior Publication Data
    US 2017/0130148 A1    May 11, 2017

Related U.S. Application Data

(60) Provisional application No. 62/196,317, filed on Jul. 24, 2015.

(51) Int. Cl.
    | | | |
    |---|---|---|
    | *C01B 3/02* | (2006.01) |
    | *C10J 3/52* | (2006.01) |
    | *F23C 10/24* | (2006.01) |
    | *C10J 3/48* | (2006.01) |
    | *C10J 3/72* | (2006.01) |

(52) U.S. Cl.
    CPC ............... *C10J 3/526* (2013.01); *C01B 3/02* (2013.01); *C10J 3/485* (2013.01); *C10J 3/723* (2013.01); *C10J 2300/093* (2013.01)

(58) Field of Classification Search
    CPC .................................. C10J 3/526; F23C 10/24
    See application file for complete search history.

(56) References Cited

U.S. PATENT DOCUMENTS

| | | | | | |
|---|---|---|---|---|---|
| 4,229,289 | A | * | 10/1980 | Victor | ...................... B01J 8/003 126/152 R |
| 4,435,364 | A | * | 3/1984 | Vorres | ...................... B01J 8/003 209/138 |
| 5,093,085 | A | * | 3/1992 | Engstrom | ............... F23C 10/24 110/165 A |
| 2011/0189054 | A1 | * | 8/2011 | Sheng | ...................... B01J 8/003 422/139 |

* cited by examiner

*Primary Examiner* — Matthew J Merkling
(74) *Attorney, Agent, or Firm* — Kening Li; Duane Morris LLP (57) ABSTRACT

A fluidized bed gasification system which comprises a fluidized bed gasification reactor having a bottom ash discharge outlet below the reactor, wherein an L-valve is used to control the rate of bottom ash discharge. The L-valve uses an aeration port located on distal side of the L-valve vertical pipe at a location that is above the center line of the horizontal pipe. Also provided are methods of controlling the bottom ash discharge as well the fluidized reaction bed height of the system.

15 Claims, 10 Drawing Sheets

HIGH TEMPERATURE AND PRESSURE SOLIDS HANDLING SYSTEM

BACKGROUND OF THE INVENTION

It has always been challenging to manage the flow of high temperature and high pressure solids, such as the bottom ash discharged from a fluidized bed coal gasifier, which need to be cooled and depressurized. Current systems typically use mechanical devices such as high temperature and/or high pressure valves and screws and other metering devices. However those devices are subject to severe wear and tear under the hostile environment of high temperature and pressure. Those devices also lack operational reliability. For example, a Synthetic Energy Systems® (SES) coal gasifier often uses a cooling screw, which needs to function both as a cooling device for the hot ash particles, and as a metering device to control solids flow rate. In addition to rapid deterioration of the cooling screw caused by the high temperature and high pressure environment, the cooling and metering functions of the cooling screw often are at odds with each other.

Other examples include mechanical slide valves and mechanical plug valves, which operate on fluidized flows and control the flow by modifying the cross-section of flow. There were used for fluidized bed catalytic cracking processes, operating at temperatures below 850° C., to control the circulation between various enclosures (Gauthier, IFSA 2008, Industrial Fluidization South Africa, pp. 35-87. Edited by T. Hadley and P. Smit Johannesburg: South Africa Institute of Mining and Metallurgy, 2008). These valves are particularly well-suited for operation on Group A particles of the Geldart classification (i.e. with a particle size ranging from 30-125 µm, and a density in the order of about 1,500 kg/m$^3$). However, it is impossible to maintain Geldart Group B particles (with a particle size of about 150-1,000 µm) fluidized without forming large gas bubbles that disturb the flow. Furthermore, the moving parts of these valves cannot be exposed to temperatures higher than 900° C., making them unsuitable for bottom ash discharge in an SES gasifier.

Non-mechanical valves such as L-valves or J-valves are known and widely used in the art. An L-valve or a J-valve consists of a vertical pipe or standpipe or downcomer equipped with a horizontal pipe, or exit arm, in an angle ranging from 45-135°. If the angle is 90°, the valve adopts the appearance similar to the letter "L" and is thus called an L-valve. See e.g. U.S. Pat. No. 8,771,549 (Gauthier et al.). In an L-valve, solids are fed by gravity, or due to pressure differential, to the vertical pipe. If the vertical line is filled with particles, injection of an aeration or motive fluid, upstream from this elbow close to the change in direction, is used to promote circulation of the particles in the line. The motive fluid inlet is conventionally located at the junction opposite the exit arm, or intersecting the vertical leg proximate to the "L" junction to provide the energy to carry the solids out the exit arm. Control of the L-valve is through the control of the flow of a motive fluid to carry the solids out the exit arm. The solids flow includes fluid transported with the solids down through the vertical pipe, where the fluid in the horizontal pipe provides a motive force to facilitate all of the fluid carrying solids out the second arm, or exit of the L-valve. Generally, the solids flow rate can be controlled by adjusting the rate at which fluid is introduced at the junction.

However, L-valves have control problems due to flow instabilities for certain flow regimes. Thus, L valves are known to be only suitable for Geldart Group B particles, which have a sufficiently high minimum fluidization velocity to allow a high particle flow rate (see Geldart, D. (1973). "Types of gas Fluidization". Powder Technology 7 (5): 285-292). A circulating bed system using L-valves to transport fine ash particles from a cyclone back into the circulating bed is described in Knowlton, T. M., (2003) "Standpipes and Non-mechanical Valves", Handbook of Fluidization and Fluid-Particle Systems, Wen-Ching Yang, editor, pp. 571-597. Marcel Dekker, Inc., New York. U.S. Pat. No. 8,753,044 to Greenwood et al. also discloses an L-valve design for the transport of solids using a motive fluid. The valve includes an inlet conduit for carrying solids, where the solids are fed through gravity. The solids are carried by fluid transport out an outlet, where the outlet conduit has a smaller diameter than the inlet conduit. A second inlet provides the source of motive fluid to drive the transport of solids.

Previously, L-valve has not been used to handle bottom ashes discharged directly underneath an SES coal gasifier or similar fluidized bed reactors, probably because the bottom ashes contain particles that were considered to be too large (generally larger 1 mm in diameter, considered to belong to the Geldart Group D or larger, even for non-agglomerating coals) to be usable with an L-valve. L-valve aeration requirements increase with an increase in particle size, particle density, and vertical section diameter (see e.g. Knowlton, T. M.; Hirsan, I., (Conference presentation) Synthetic pipeline gas symposium, Chicago, Ill., USA, 31 Oct. 1977 Solids flow control using a non-mechanical L-valve). Operating the L-valve with Geldart Group D particles needs significantly more gas aeration compared to that with Geldart A or B particles for a given solids flow rate (see Wang and Fan, L-Valve Behavior in Circulating Fluidized Beds at High Temperatures for Group D Particles, Ind. Eng. Chem. Res., 2015, 54 (16), pp 4468-4473). For such large particles, the amount of gas needed to aerate the particles to keep them flowing in the L-valve would be very high so as to interfere with the pressure control within the fluidized bed (see Knowlton et al., supra).

There is therefore a need for an improved method and related devices that overcome the problems of the prior art.

SUMMARY OF THE INVENTION

The present invention utilizes a non-mechanical device to manage solids flow rates, cooling, and depressurization of the bottom ash of a fluidized bed reactor, such as a fluidized bed coal gasifier.

In one embodiment, the present invention provides a fluidized bed gasification system which comprises a fluidized bed gasification reactor having a bottom ash discharge outlet below the reactor, wherein an L-valve is used to control the rate of bottom ash discharge, the system comprising:

i. an L-valve located downstream of and connected to the bottom ash discharge outlet for controlling the solids flow rate, wherein the L-valve comprises: an inlet pipe having a first diameter $D_I$ and having an inlet pipe end; an outlet pipe having a second diameter $D_O$ that is between 50% and 75% of the first diameter, and oriented at a valve angle between 45 degrees and 135 degrees relative to the inlet pipe, where the outlet pipe has an outlet pipe end and the inlet pipe has a proximate side that is on the same side as the outlet pipe end and a distal side that is opposite the outlet pipe end, and where the outlet pipe end is aligned with the proximate side; and ii. an aeration fluid inlet conduit for carrying aeration fluid into the inlet and wherein the opening of the aeration fluid inlet conduit is located on distal side of the inlet pipe at a location that is above the center line of the outlet pipe by a distance H, wherein the $H/D_f$ ratio is between the range of about 1-3. In one embodiment, the $H/D_f$ ratio is about 1.5-2.5. In another embodiment, the $H/D_f$ ratio is about 1.5-2. The aeration fluid is steam, $CO_2$, or $N_2$, or a suitable mixture thereof.

In an embodiment, the above system of the present invention further comprises a cooling device into which the solids are discharged from the outlet pipe.

In an embodiment, the above system of the present invention further comprises an ash cooling vessel located between the ash discharge outlet of the fluidized gas reactor and the inlet pipe of the L-valve.

In an embodiment, the above system of the present invention further comprises a means for fluidizing the ash particles discharged from the bottom ash discharge outlet of the fluidized gas reactor wherein gas from the reactor is stripped from the ash particles with a stripping gas. In an embodiment, the means for fluidizing the ash particles comprises a transition region or conical region where a wider downcomer of the bottom ash discharge outlet is transitioned into a narrower inlet pipe of the L-valve. In an embodiment, the above system of further comprises a differential pressure control means (DP-3) for measuring and controlling the pressure differential the transition region or conical region, and a point in the bottom ash discharge outlet near the point where venturi steam enters the discharge outlet, wherein operation of the stripping fluidized bed above the L-valve inlet pipe is monitored.

In a preferred embodiment, the valve angle of the system of the present invention is about 90 degree.

The system of the present invention may further comprise a first differential pressure control means (DPT1) for measuring pressure differential between the aeration fluid inlet conduit and a location where the stripping gas is added in the transition region or conical region. The system may further comprise a second differential pressure control means (DPT2) to measure the pressure drop between the aeration fluid inlet conduit and a point in the L-valve outlet pipe.

The system further comprises a differential pressure control means to measure and control pressure across the horizontal section.

The present invention further provides a method for managing bottom ash discharge rate of a fluidized bed gasification reactor, wherein the system of claim 1 is used and wherein bottom ash discharge rate is controlled by controlling the amount of aeration fluid inputted to the L-valve.

In a further embodiment, the present invention provides a method for controlling the height of the fluidized bed inside the fluidized bed reactor of the system of claim 1, wherein when the bed height drops below a desired value, the controller sends a signal to an L-valve aeration control valve to close slightly in order to reduce the discharge rate through the L-valve; and wherein when the bed height increases above a desired bed height, the controller will send a signal to the L-valve aeration control valve to open to increase the aeration to the L-valve so that more solids will be discharged.

DESCRIPTION OF THE INVENTION

It has been surprisingly discovered that the bottom ash particles, despite the fact that they contain particles having a size of over 1000 μm in diameter, behave unexpectedly under high pressure and high temperature, and that their discharge flow can be managed using an L-valve.

In some embodiments, the bottom ash contains particles whose size is more than 6,000 μm in diameter. An example of the particle size distribution of a suitable bottom ash sample is shown in Table 1 below:

TABLE 1

| Particle Size Distribution of Bottom Ash Discharged from an SES Gasifier | |
|---|---|
| Particle Size (μm) | Wt % |
| >6,000 | 1.37 |
| 2,000/6,000 | 9.29 |
| 900/2,000 | 21.65 |
| 125/900 | 49.66 |
| <125 | 18.04 |
| Total Wt % | 100.0 |

The solids have an average bulk density of approximately 1150 kg/m³ (71.8 lb/ft³).

Accordingly, in an embodiment, this invention provides a coal gasification system which comprises an SES® fluidized bed coal gasifier which uses a non-mechanical L-valve device, instead of a conventional mechanical valve to meter the flow of the high-temperature, high-pressure bottom ash solid particles.

SES® fluidized bed coal gasifiers are known and readily available in the art. See e.g. U.S. Pat. No. 8,968,431 (Method and apparatus for cooling solid particles under high temperature and pressure): U.S. Pat. No. 8,920,736 (Loop seal for recycling solids from a cyclone and fluidized bed reactor and method using the same), and U.S. Pat. No. 7,879,294 (Method and apparatus for fine solids recycle), all of which are incorporated herein by reference in their entirety.

Typically, in an SES gasifier, coal particles have a size range of from about 1,000 μm to about 5.000 μm, typically with a top size of about 6,350 μm and less than 10% below a bottom size of +149 micron. These particles react with steam and air or oxygen in a fluidized-bed gasifier at temperatures of from about 840° C. to about 1,100° C., and at a pressure range from about 50 psig (about 446 kPa) to about 450 psig (about 3,204 kPa).

For cooling solids metered out of the L-valve, in place of cooling screws, the system of the present invention may further comprise a fluid bed cooling device with either direct or indirect cooling.

For depressurization, the system of the present invention may further comprise a restricted pipe flow device to accomplish pressure reduction. These devices can be applied individually or combined.

Compared to the prior art, this system has greatly improved reliability of operation of solids discharge, cooling, and depressurization from a pressurized fluidized bed or other reactors requiring solids discharges, cooling, or depressurization, due to the minimization or elimination of regular maintenance necessary for seals and moving parts.

Figure 1:
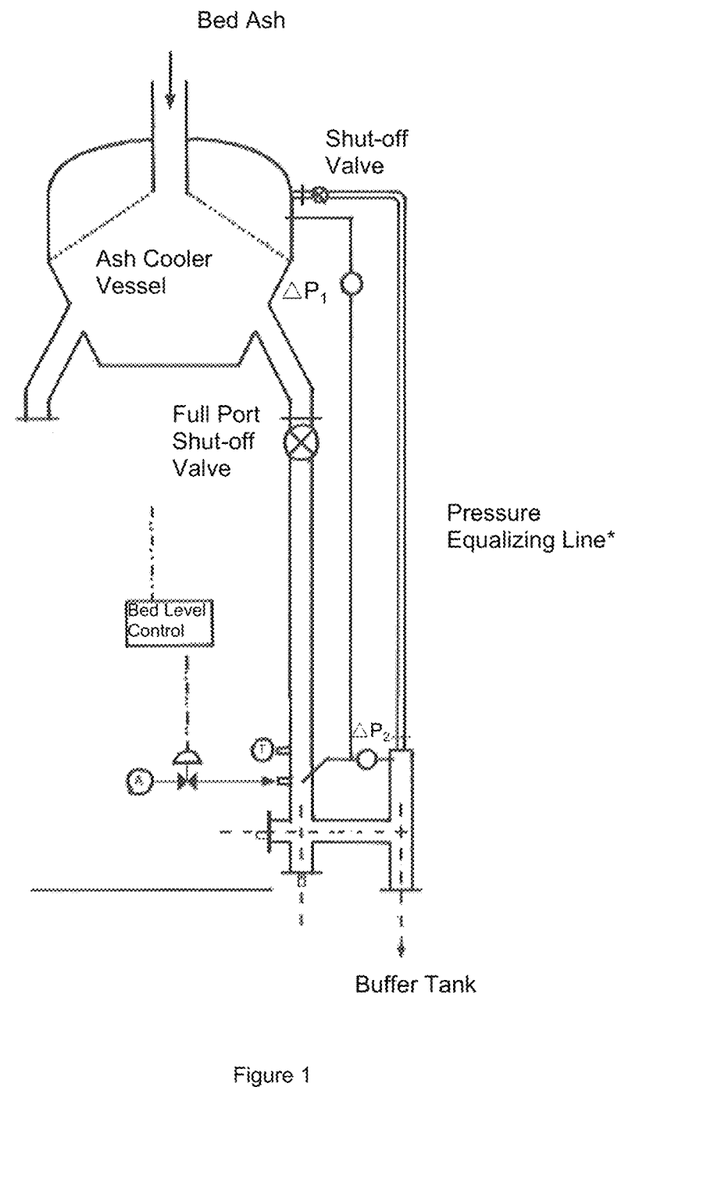
FIG. 1 shows a schematic drawing of an embodiment of the system of the present invention, wherein an ash cooling vessel is provided between the bottom ash discharge conduit and the L-valve vertical pipe.

FIG. 1 shows the schematics of one embodiment of the invention.

In an SES fluidized bed gasification system comprising a fluidized bed region located in a vessel, and a bottom ash discharge device, such as a venturi with a center pipe and a downcomer, wherein the bottom ash is discharged by way of a bottom end of the venturi downcomer, the present invention provides an improvement which comprises: 1) an L-valve to control the solids flow rate, wherein the L-valve is located at the bottom of and in fluid communication with of an SES fluidized bed gasifier through the venturi downcomer and comprises a vertical pipe and a horizontal pipe, 2) optionally a lock hopper or another device to depressurize the solids and 3) a cooling screw or another cooling device into which the solids are discharged from the L-valve.

The above system allows the cooling screw to operate at its optimum rotation speed.

The L-valve piping configuration in one embodiment is connected directly to the classifier section below the venturi of the gasifier, i.e. there is no lock hopper.

In another embodiment, the L-valve piping is connected to an ash-cooler lockhopper system.

A schematic drawing showing how the L-valve would be incorporated into the discharge system of the present invention is shown in FIG. 1.

A differential pressure transmitter on the gasifier indicating the height of the fluidized bed feeds a signal into a controller. When the bed height drops below a desired value, the controller will send a signal to the L-valve aeration control valve to close slightly in order to reduce the discharge rate through the L-valve. If the bed height increases above the desired bed height, the controller will send a signal to the L-valve aeration control valve to open to increase the aeration to the L-valve so that more solids will be discharged. Conversely, if the bed height drops below the bed height desired, the controller will send a signal to the L-valve aeration control valve to close so that the solids discharge rate will be reduced.

An aeration port is used to facilitate and control the flow rate of the solids flow. For an L-valve with a vertical pipe having an inner diameter of D mm, the aeration port is, in one embodiment, located on the L-valve at a location that is H mm above the center line of the L-valve horizontal section, where the H/D ratio should be above 1, but not more than 2. Preferably, the ratio should be around 1.5. It has been found that aeration is most efficient when the H/D ratio is in such ranges. The aeration line should be located on the opposite side (180 degrees away) from the L-valve discharge opening.

The aeration gas for the L-valve may be $CO_2$, steam or nitrogen. The volumetric values of nitrogen and $CO_2$ are almost the same. While not wishing to be bound by any speculation on mechanism, applicant believes that this is because the gas-solids flow is in the viscous regime where only the gas viscosity contributes to producing the drag on the particles. The values of the gas viscosity for nitrogen and $CO_2$ are essentially the same at 650° C. Therefore, the volumetric flows of the two gases are almost the same as well.

To monitor L-valve operation, a differential pressure transmitter ($\Delta P_1$) should be connected between a pressure tap at the same axial location as the L-valve aeration (and 90 degrees away from the L-valve aeration) and the freeboard of the Ash Cooler Vessel (FIG. 1). In addition, a second differential pressure transmitter ($\Delta P_2$) should measure the pressure drop between the L-valve aeration point and a point in the pipe section extending above the L-valve discharge piping. This latter point is in the same general location as the nozzle for the Pressure Equalizing Line.

One feature about the L-valve is that the solids flow through the L-valve can be stopped, yet the aeration to the L-valve does not need to be shut off. This is because the L-valve takes a certain threshold amount of gas to start solids flowing through it. If the aeration flow through the L-valve is below this minimum threshold amount, then solids will not flow through the L-valve.

Figure 2:
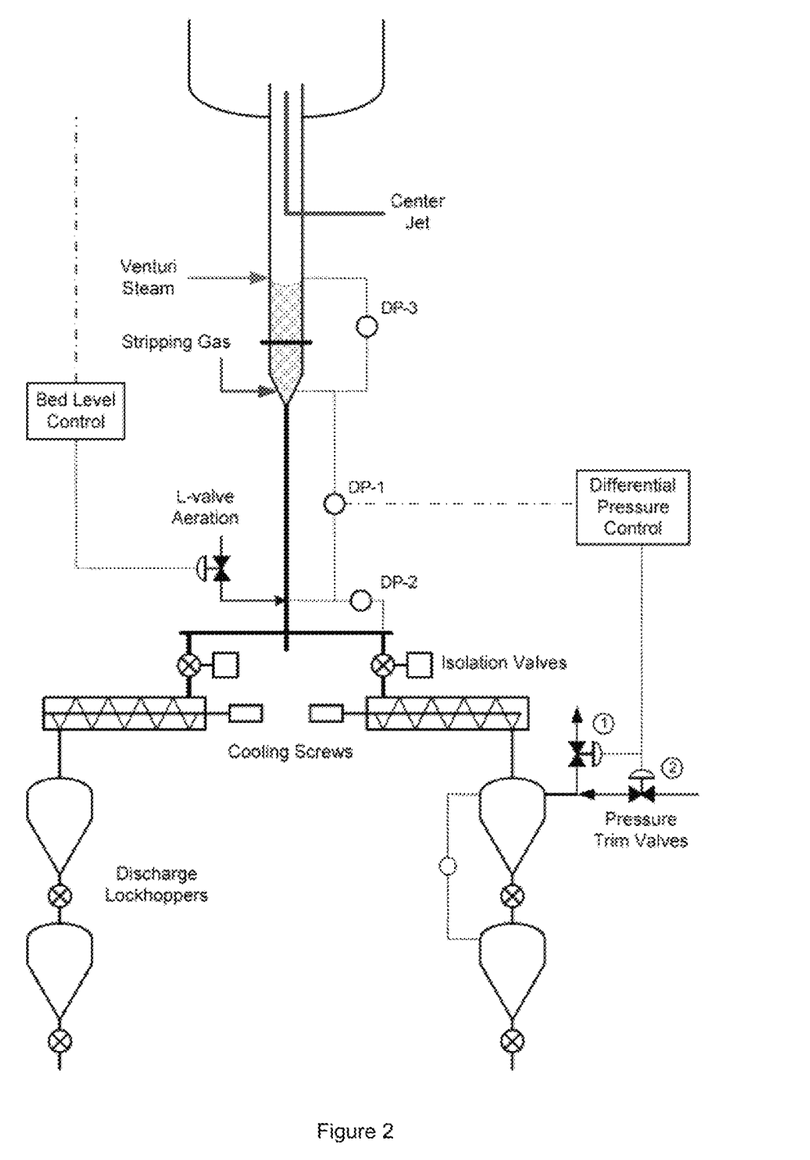
FIG. 2 shows a schematic drawing of an embodiment of the system of the present invention, wherein among other things, the location of stripping is shown.
Figure 3:
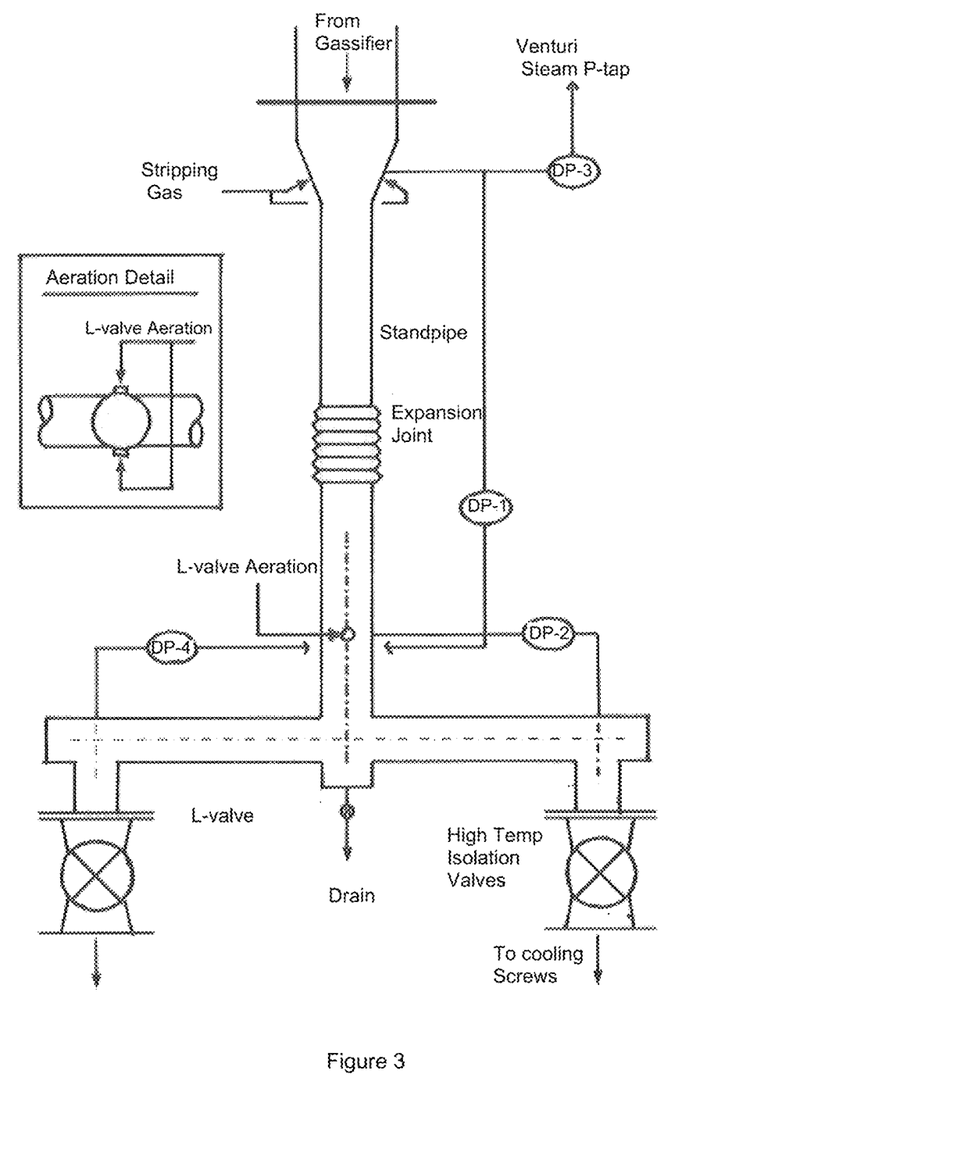
FIG. 3 shows a detailed schematic drawing of an L-valve used for an embodiment of the system of the present invention.
Figure 3A:
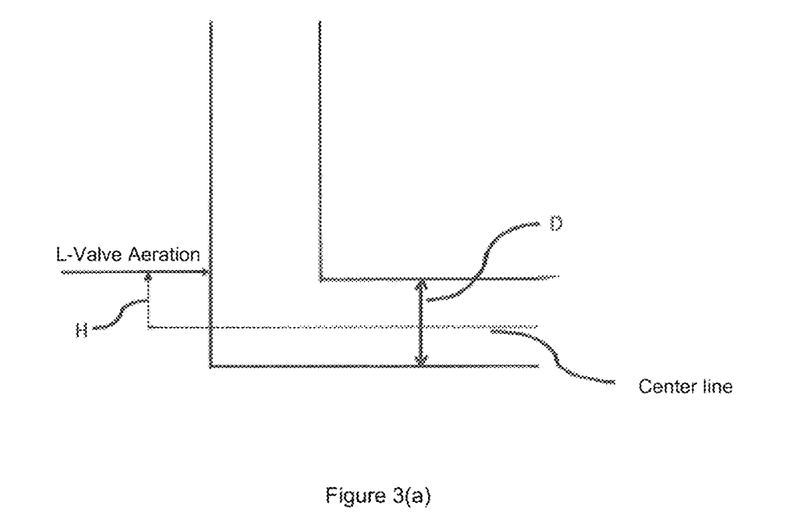
FIG. 3(a) is an enlarged view of the L-valve in FIG. 3, showing the location to add aeration gas.

FIG. 2 is a schematic drawing showing another embodiment of the system of the present invention. A more detailed L-valve design drawing is shown in FIG. 3.

A L-valve is located below the flange at the bottom of the classifier section of an SES® fluidized bed gasifier below the venturi, fitting between the bottom of this flange and the top flanges of the high-temperature isolation valves immediately above the entrance to a cooling screw. The vertical standpipe above the L-valve will be sized depending on the solids flow rate desired through the L-valve, and the average bulk density of the ash particles. For example, the discharge solids flow rate typically may ranges from 0 to 9000 kg/h (0 to 19,800 lb/h) for a particular SES gasifier specification, where the solids have an average bulk density of approximately 1 g/cm³ (62.4 lb/ft³). In this case, the volumetric flow rate of the solids will range from approximately 0 to 320 ft³/h (9.1 m³/h) or 0.089 ft³/s. The superficial velocity of the solids in the L-valve depends on the diameter of the L-valve. The maximum velocity in the standpipe is shown below in Table 1 for various pipe diameters. The maximum velocity is the linear solids velocity in the standpipe at the maximum solids discharge rate from the gasifier. Minimum fluidization velocities as a function of the particle size are shown in Table 3.

The system may optionally comprise two L-valves, enabling an L-valve to feed each of two cooling screw. Only one L-valve would be used at any one time.

Similarly, the L-valve can be used to control the bed height. A differential pressure transmitter indicating the height of the fluidized bed will feed a signal into a controller. When the bed height drops below its desired value, the controller will send a signal to the L-valve aeration control valve to close slightly in order to reduce the discharge rate through the L-valve. If the bed height increases above the bed height desired, the controller will send a signal to the L-valve aeration control valve to open to increase the aeration to the L-valve so that more solids will be discharged.

TABLE 2

Solid Velocities in L-valve for Different L-Valve Diameters

| L-Valve Dia, in | Area, ft² | Max Solids Velocity, ft/s* |
|---|---|---|
| 6 | 0.196 | 0.454 |
| 8 | 0.349 | 0.255 |
| 10 | 0.545 | 0.163 |
| 12 | 0.785 | 0.113 |
| 17.5 | 1.670 | 0.053 |

*Calculated at the maximum discharge rate of 19,800

TABLE 3

Minimum Fluidization Velocities as a Function of Particle Size

| Particle Size, microns | Minimum Fluidization Velocity, ft/s** |
|---|---|
| 200 | 0.037 |
| 250 | 0.057 |
| 300 | 0.083 |
| 400 | 0.146 |

**Calculated using steam at 1832° F. and 53.5 psig

It is desired to prevent the system gas from the gasifier from flowing down through the L-valve. This can be accomplished by stripping in a moving packed-bed mode with just L-valve air if the velocity of the solids is lower than the minimum fluidization velocity. Whether this will occur depends on the size of the discharged material. If the average particle size of the material is 250 microns, the minimum fluidization velocity for this material is 0.057 ft/s. The solids velocity in the 10-in-diameter pipe is 0.163 ft/s at the maximum discharge rate. Therefore, this velocity is higher than the minimum fluidization velocity for the particles, and the solids will not strip (except at very low solids discharge rates). The solids velocity in the 17.5-in-diameter pipe above the 10-in-diameter L-valve standpipe at the maximum solids discharge rate would be 0.053 ft/s. Therefore, solids of this average size can be stripped in this pipe diameter. However, if the solids are 200 microns in average size, then these solids cannot be stripped in a moving packed-bed mode at the maximum discharge rate. This is because the minimum fluidization velocity (0.037 ft/s) is lower than the solids velocity in the 17.5-in-diameter pipe (0.053 ft/s) at the maximum discharge rate.

To prevent the gas from the gasifier from discharging from the gasifier, the solids may be fluidized at a low velocity before it enters the vertical pipe or inlet pipe of the L-valve. The fluidization gas strips the gasifier gas from the solids. In one embodiment, the down comer from the Venturi pipe, being wider than the vertical pipe of the L-valve, is transitioned by way of a conical section (see FIG. 2), and the fluidizing gas is added in the conical section.

The amount of aeration gas required for the L-valve depends on the type of gas that is used for aeration. In addition to nitrogen and carbon dioxide, steam may also be used for L-valve aeration. The amount of aeration required to flow discharge solids through the L-valve at the maximum expected solids discharge rate of 19,800 lb/h is shown in Table 3 for both steam and $CO_2$. The estimated amount of steam required to discharge solids through the L-valve at the maximum discharge rate was determined to be 2.5 lb/h. The corresponding aeration rate using $CO_2$ was 5.9 lb/h.

Previously, it was thought that the optimum aeration tap location for an L-valve is as close to the L-valve bend as possible, as this location was believed to give the maximum solids flow rate through the L-valve. See Knowlton and Hirsan supra. However, the present inventor surprisingly discovered that a preferred location to add aeration gas for the L-valve is approximately 2 H/D's above the center line of the horizontal section of the L-valve, wherein H is the height of the aeration port relative to the centerline of the horizontal pipe, and D is the diameter of the vertical pipe of the L-valve.

To monitor L-valve operation, a differential pressure transmitter (DPT1) may be connected between a pressure tap at the same axial location as the L-valve aeration (and 90 degrees away from the L-valve aeration) and the same axial location in the cone where the gas is added for the stripping section (FIG. 2). In addition, a second differential pressure transmitter (DPT2) should measure the pressure drop between the L-valve aeration point and a point in the L-valve horizontal section that is located on the top of the horizontal pipe at a point on the center line of the vertical pipe connecting to the high-temperature isolation valves. Each L-valve should have a differential pressure transmitter to measure this pressure across the horizontal section.

In addition, a differential pressure transmitter (DPT3) should be connected between the point where the fluidizing gas enters the transition section between the 10-in-diameter L-valve standpipe and the 17.5-in-diameter pipe below the venturi and some point in the discharge pipe above the point where the venturi steam enters the discharge pipe (FIG. 2). DPT3 will be used to monitor the operation of the stripping fluidized bed above the L-valve standpipe.

For good L-valve operation, the value of DPT1 will be controlled at a fixed differential pressure. It is assumed that this differential pressure will be of the order of 1 psi. This differential pressure will be controlled by adding or removing gas from the top, dilute-phase area of the upper (high-pressure) lockhopper vessel. This pressure will be controlled by two control valves attached to the lockhopper vessel as shown in FIG. 1. If the value of DPT1 decreases, gas will be added to the top of the lockhopper to increase the pressure in the lockhopper. This will increase the pressure at the bottom of the L-valve standpipe. Because the pressure at the top of the standpipe will remain approximately constant, the pressure drop across the L-valve standpipe will increase. Similarly, if the value of DPT1 increases, gas will be exhausted from the lockhopper to decrease the pressure drop across the L-valve standpipe.

The invention is illustrated by the following examples, which are not intended to be limiting in any way.

EXAMPLES

Gasifier Cold Model Discharge System Testing

The gasifier cold model discharge testing was conducted at the research laboratories of Particulate Solid Research, Inc. (PSRI) in Chicago, Ill.

a) Description of Equipment

Figure 4:
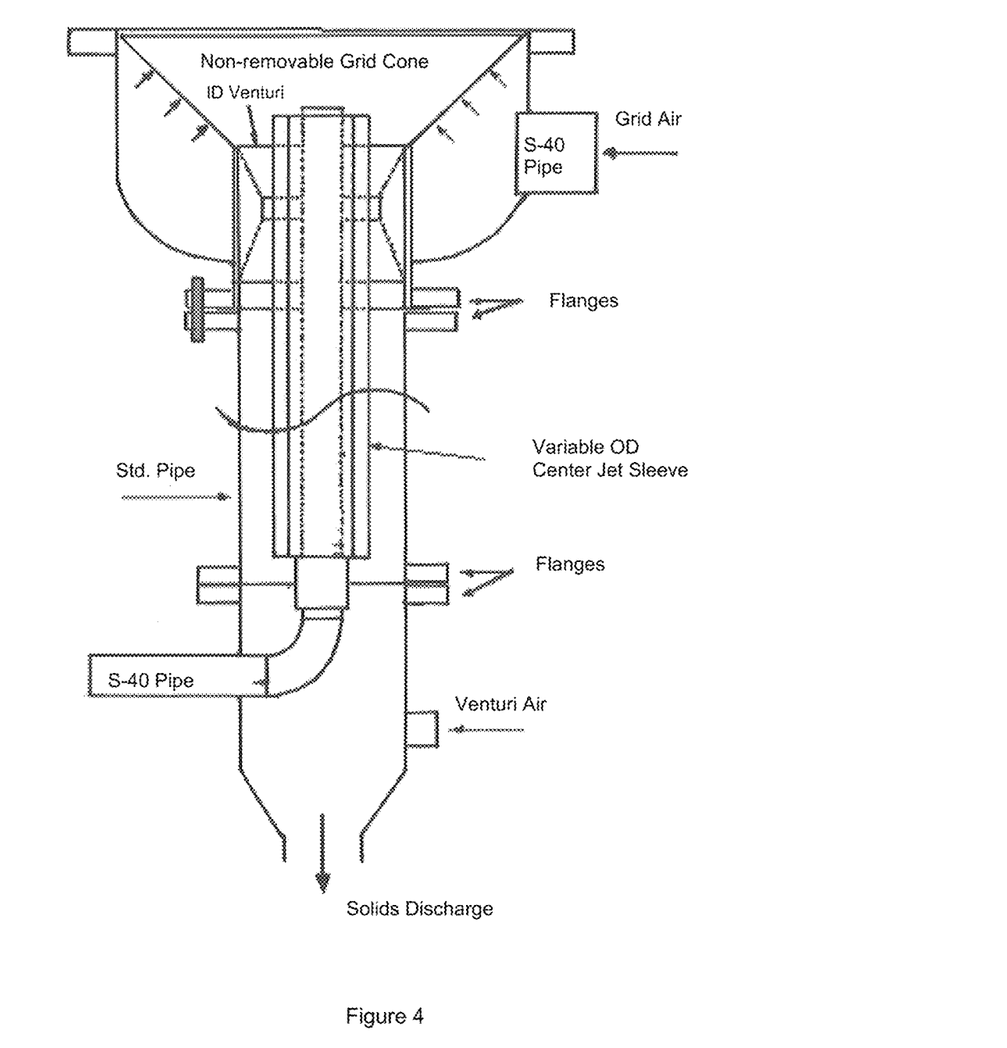
FIG. 4 is a detailed schematic drawing of a venturi discharge section of the system of the present invention.

The cold flow testing was conducted at PSRI's research laboratories in Chicago, Ill., USA. An existing cold-flow test facility was modified to allow the desired testing. The primary vessel in the cold model was a 3-ft (0.9-m)-diameter fluidization column which housed the simulated gasifier bed. The vessel was approximately 20 feet (6 m) high which allowed large disengaging heights above the bed. The vessel was flanged near the bottom and the bottom flanged head contained a conical gas distributor and the venturi discharge test section. A drawing of the 10-in (25-cm)-diameter venturi section is shown in FIG. 2. Schematic drawings of the 8-in (20-cm) and 6-in (15-cm)-diameter venturis are shown in FIGS. 3 and 4, respectively. The venturi discharge configuration was a scale simulation of the venturi discharge section of the SES gasifiers. A 16-in (40-cm)-diameter nozzle was attached to the bottom head. The bottom part of the head housed the various diameters of venturi sections that were tested in the unit. All of the various venturis tested then were reduced down to a 6-in (15-cm)-diameter pipe. This pipe was then attached to a loop seal which fed solids into the bottom section of a 6-in (15-cm)-diameter riser.

The solids from the riser traversed a 90-degree elbow and entered a cyclone. The gas and any uncollected solids bypassing the primary cyclone were then routed into a secondary cyclone. A loop seal below the primary cyclone transferred the solids into the dipleg of the second-stage cyclone. Solids from both the primary and the secondary cyclone flowed into a loop seal and then into the fluidized bed. This cyclone/dipleg arrangement was the same as that proposed for the Yima gasifier. This cyclone arrangement was referred to as the Riser Cyclone System or the Riser Cyclones.

The gas from the fluidized bed exited at the top of the 3-ft (0.9-m)-diameter fluidized bed and was routed into a primary and then a secondary cyclone. As with the riser cyclone system discussed above, the solids from the primary cyclone passed through a loop seal and discharged into a straight second-stage dipleg. Solids from both the primary and the secondary cyclone flowed into an automatic L-valve and then into the fluidized bed. This cyclone set was called the Entrainment Cyclone System or the Entrainment Cyclones.

Both cyclone sets used in the test unit incorporated a novel dipleg configuration in which the solids from the first stage cyclone were added to the second-stage dipleg via a loop seal which allowed the solids to be transferred from the higher pressure outlet of the first stage cyclone to the lower pressure second stage outlet. The diplegs, loop seals and the automatic L-valve in the cold model were constructed of 6-in (15-cm)-diameter pipe.

A storage hopper was used to store discharged solids from the bed when it was necessary to remove solids from the unit to change configurations or particle sizes. System solids were drained from the bottom of the loop seal below the riser primary cyclone. During start up when solids had to be fed back into the unit, the solids were fed into the bottom of the riser from the storage hopper.

Gas could be fed into the fluidized bed in three ways: 1) through the center jet, 2) through the venturi, and 3) through the angled gas distributor as indicated in FIG. 2. The gas from the fluidized bed and the gas from the riser were routed through the two cyclone systems described above, and then into a bag filter for final cleanup.

The test unit was designed to allow the addition of different sizes of venturi discharge configurations to be added to its bottom. Assemblies with venturi diameters of 10, 8 and 6 inches (25, 20 and 15 cm) were designed, built and tested. A schematic drawing of the 10-in (25-cm)-diameter venturi discharge configuration is shown in FIG. 4.

Figure 5:
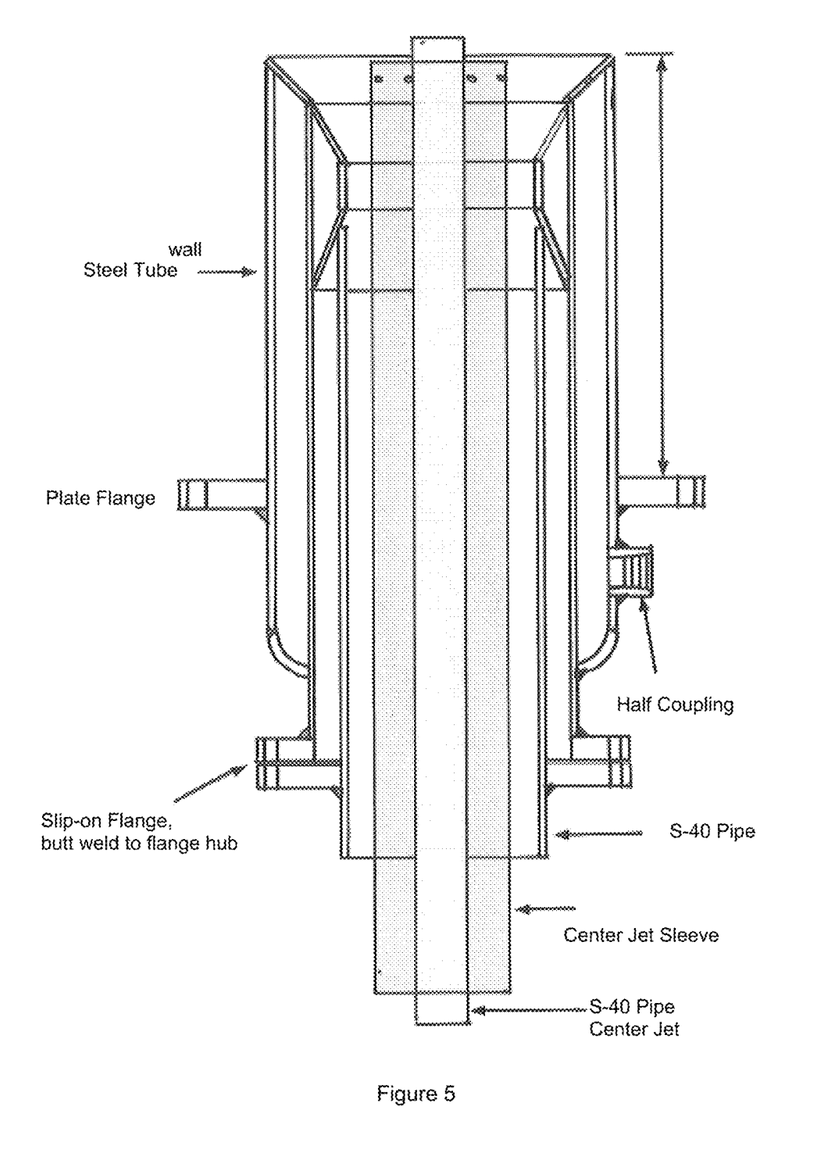
FIG. 5 shows a schematic drawing of the plenum insert of a straight discharge nozzle.
Figure 6:
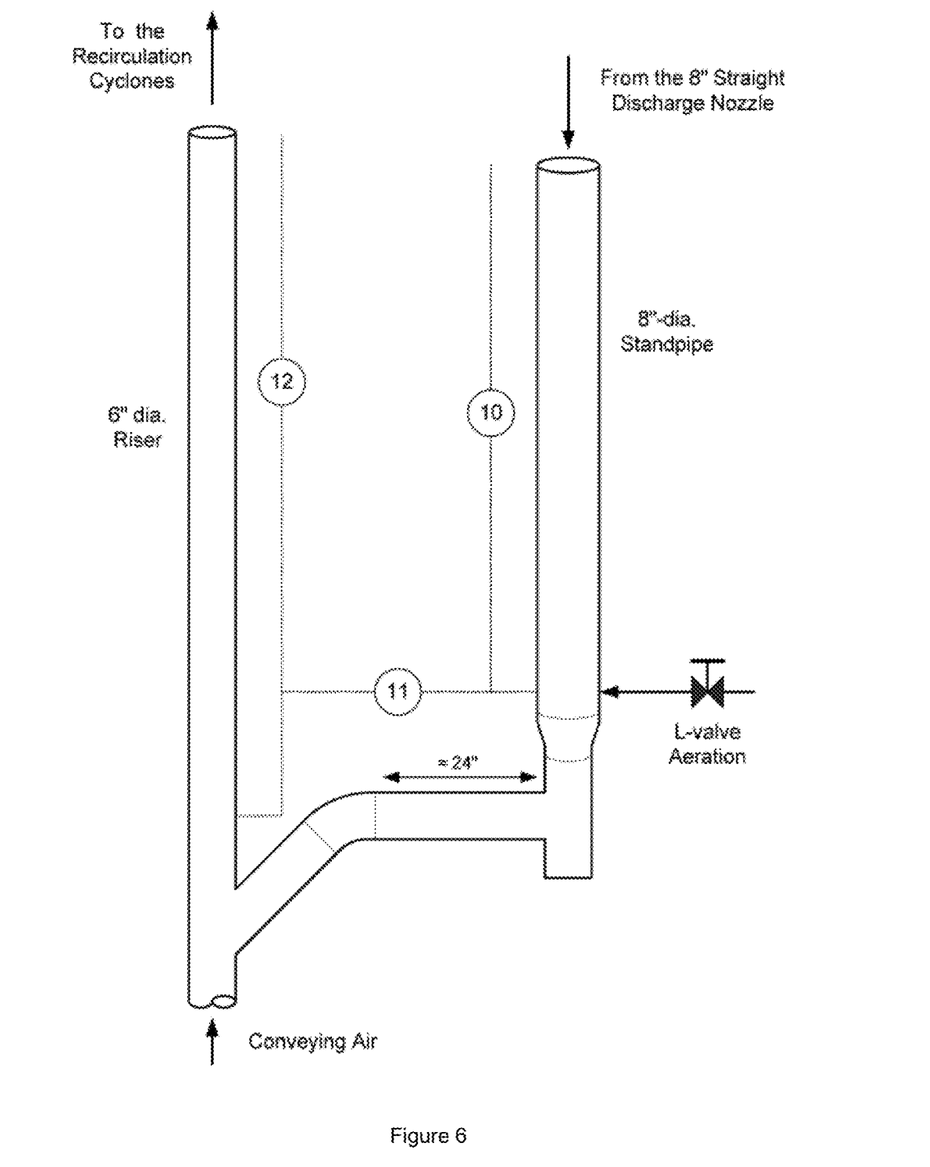
FIG. 6 depicts the L-valve test configuration.

In addition to the venturi/classifier assemblies described above, a straight pipe discharge assembly was designed and tested (FIG. 5). A straight pipe discharge assembly was used to test an L-valve type of dense-phase discharge configuration (FIG. 6).

The test unit was capable of operating at pressures up to 15 psig (103 kPag). This gave an operating gas density range of approximately 0.08 to 0.15 lb/ft$^3$ (1.3 to 2.4 kg/m$^3$). The gas density for hot gasifiers operating at a temperature of 1850° F. (1010° C.) and a pressure of 10 barg (145 psig) is approximately 0.135 lb/ft$^3$ (2.16 kg/m$^3$). Therefore, the gas densities used in the cold model bracketed this density. To set the pressure in the unit, a back-pressure control valve was placed downstream of the cyclones in order to control system pressure.

b) Test Materials

Two test materials were used in the test program. One material was a Group A Flexicoke and the second material was a Group B Flexicoke. Both materials were wide PSD materials. The Flexicoke material was used to try to simulate the coal material used in the SES gasifiers. The particle size distribution of the Group A material originally fed to the test unit is shown in Table 4. The median particle size of this initial material was approximately 98 microns. However, as the testing proceeded with this material, some of the fines were gradually elutriated from the bed. The final median particle size of this material was approximately 139 microns, and is given in Table 5. The median particle size of the Geldart Group B material tested was approximately 182 microns, and its particle size is shown in Table 6. The smaller Flexicoke had a loose bulk density of 51 lb/ft$^3$ (816 kg/m$^3$) and a tapped bulk density of 66.4 lb/ft$^3$ (1062 kg/m$^3$). The larger Flexicoke material had a loose bulk density of 51 lb/ft$^3$ (816 kg/m$^3$) and a tapped bulk density of 60.8 lb/ft$^3$ (973 kg/m$^3$).

c) L-Valve Discharge Testing

An L-valve was also tested as a solids discharge control device (FIG. 6). This device differs from the venturi discharge in that the solids are in dense, packed-bed flow above the L-valve, whereas in the venturi and the straight-pipe discharge configurations the solids discharge in dilute-phase flow. It takes much less gas to control the solids flow rate through the L-valve compared to the venturi or the straight-pipe configurations. To control the solids discharge, aeration is added to the valve above the elbow. Increasing aeration to the L-valve increases the solids flow rate through it, and the solids flow rate is decreased by reducing the amount of aeration.

TABLE 4

Initial Group A Particle Size Distribution

| Size, Microns | Cumulative Weight % Less Than |
|---|---|
| 300 | 100 |
| 206 | 91.1 |
| 146 | 70.8 |
| 122 | 59.7 |
| 102 | 51.2 |
| 86 | 45.9 |
| 72 | 42.6 |
| 60 | 40.4 |
| 50 | 38.8 |
| 36 | 36.3 |
| 25 | 33.2 |
| 18 | 29.5 |
| 10 | 19.1 |
| 4 | 5.1 |

TABLE 5

Final Group A Particle Size Distribution

| Size, Microns | Cumulative Weight % Less Than |
|---|---|
| 300 | 100 |
| 206 | 94.3 |

TABLE 5-continued

Final Group A Particle Size Distribution

| Size, Microns | Cumulative Weight % Less Than |
|---|---|
| 146 | 55.0 |
| 122 | 36.2 |
| 102 | 23.2 |
| 86 | 15.6 |
| 72 | 10.7 |
| 60 | 7.5 |
| 50 | 5.4 |
| 36 | 3 |
| 25 | 1.6 |
| 18 | 0.8 |
| 10 | 0.1 |
| 4 | 0 |

The L-valve that was tested had an 8-in (20-cm)-diameter standpipe above it that reduced down to a 6-in (15-cm)-diameter pipe just before the L-valve bend. The aeration in the L-valve was added approximately 16 inches (40 cm) above the center-line of the horizontal section of the L-valve in the 8-in (20-cm)-diameter section. The horizontal section of the L-valve was 24 inches (0.6 m) long and then angled downward approximately 45 degrees before it discharge into the 6-in (15-cm)-diameter riser (FIG. 6).

TABLE 3

Group B Particle Size Distribution

| Size, Microns | Cumulative Weight % Less Than |
|---|---|
| 3000 | 100 |
| 1680 | 97.7 |
| 850 | 93.9 |
| 425 | 90.6 |
| 250 | 82.0 |
| 177 | 48.2 |
| 150 | 23.3 |
| 125 | 7.2 |
| 88 | 2.4 |
| 75 | 0.8 |
| 53 | 0.4 |
| 44 | 0.1 |
| 0 | 0 |

For a non-agglomerating gasifier, it is not necessary (and probably not advisable) to control solids discharge using the dilute-phase venturi discharge technique. Because the solids in the gasifier bed are Group B solids (material with an average particle size greater than approximately 120 microns) it is feasible to use a non-mechanical L-valve to control the solids flow rate out of the gasifier.

To show that the L-valve would control the solids discharge from the fluidized bed, tests were conducted by varying the solids flow rate through the L-valve using L-valve aeration. Tests were conducted with a bed height of 6 ft (1.8 m), a system pressure of 5 psig (34.5 kPag) and Group B Flexicoke. Air was used as the aeration gas. The results of the testing are shown in FIG. 7.

Figure 7:
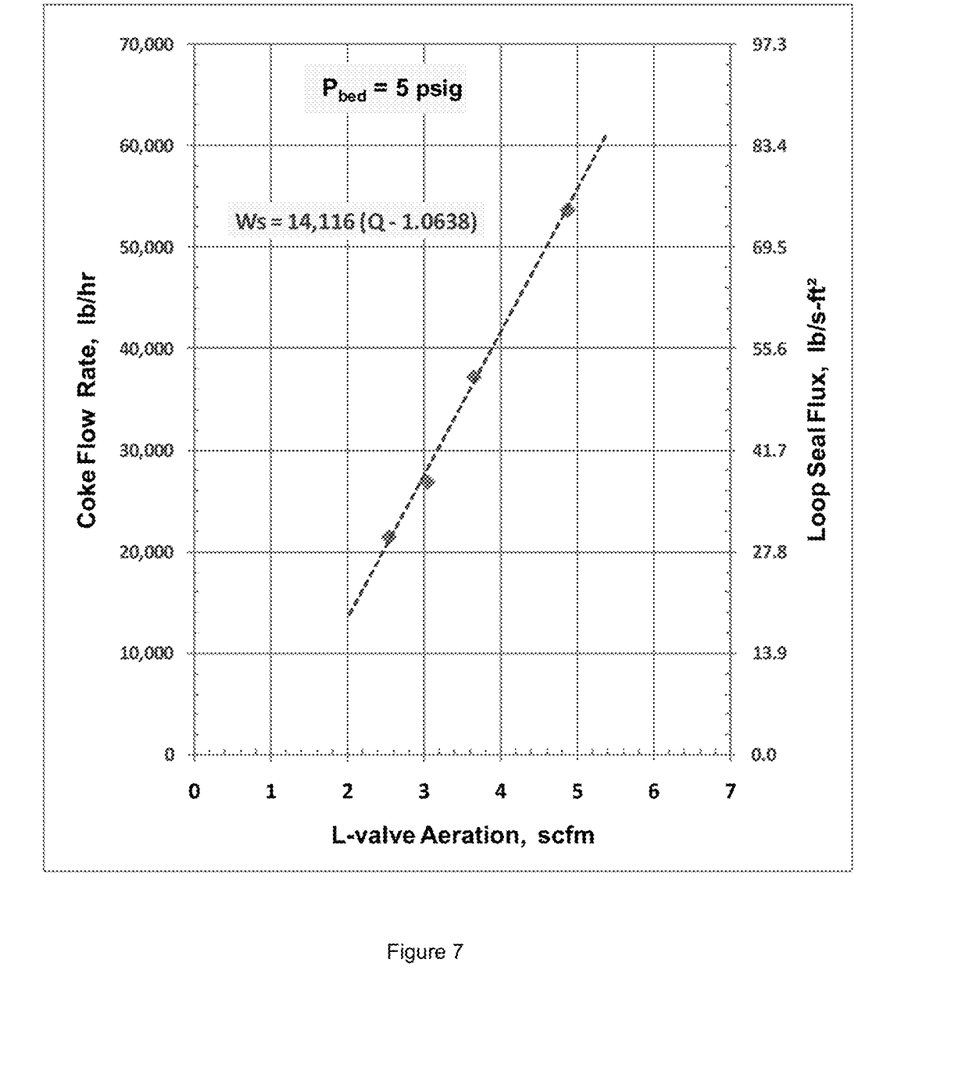
FIG. 7 shows the L-valve discharge rate at different aeration values.

As shown in FIG. 7, as the aeration to the L-valve was increased, the solids flow rate through the L-valve increased linearly with the amount of aeration added to the L-valve. The amount of solids flow possible through the 6-in (15-cm)-diameter L-valve was much greater than the solids flow rates obtained through either the venturi or the straight-pipe discharge configurations. As an example, the solids flow rate through the L-valve was 54,000 lb/h (24.545 kg/h, or approximately 900 lb/min (409 kg/min). The maximum solids rate obtained with through the venturi or straight-pipe configurations was approximately 328 lb/min (149 kg/min) with the 10-in (25-cm)-diameter venturi. The gas flow rate through the venturi at this solids discharge rate was approximately 218 scfm (6.2 Nm$^3$/min). However, to achieve a solids flow rate of approximately 2.7 times the rate through the 10-in (25-dcm)-diameter venturi configuration, the 6-in (15-cm)-diameter L-valve used only 5 scfm (0.14 Nm$^3$/min).

From the results of the testing, the conclusion was that the L-valve can be used to reliably control the solids flow rate out of the gasifier.

Also shown on FIG. 7 is a curve showing the solids flux through the 6-in (15-cm)-diameter loop seal at the solids flow rates passed through the L-valve. The maximum flux through the loop seal was approximately 75 lb/s-ft$^2$ (375 kg/s-m$^2$). This test showed that the loop seal can flow solids through it a high flux. Previous testing at PSRI has shown that the solids flux through a loop seal can exceed 140 lb/s-ft$^2$ (700 kg/s-m$^2$).

Figure 8:
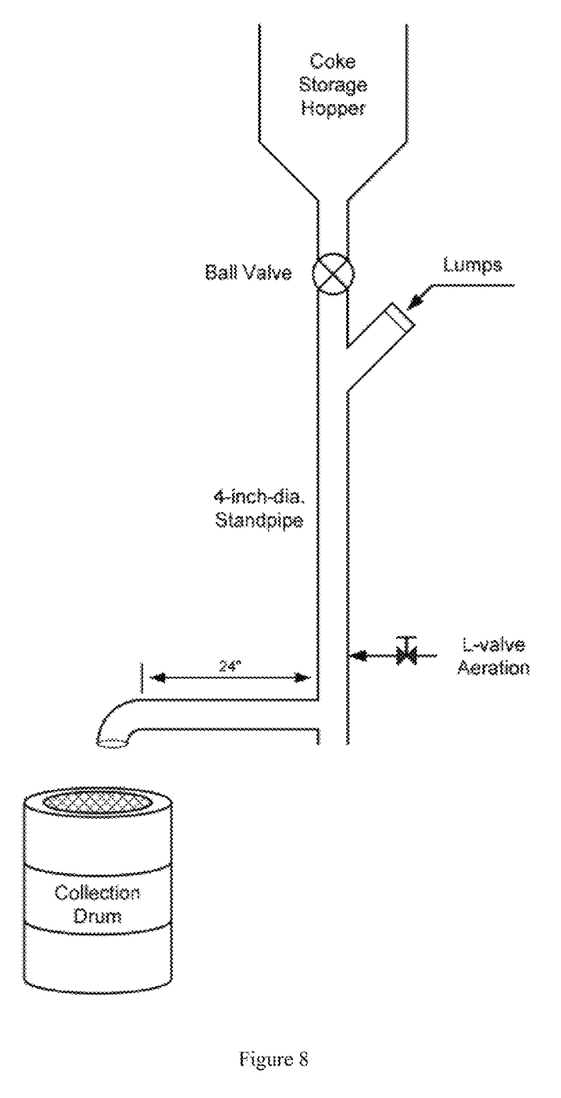
FIG. 8 shows the L-valve agglomerate discharge test setup.
Figure 9:
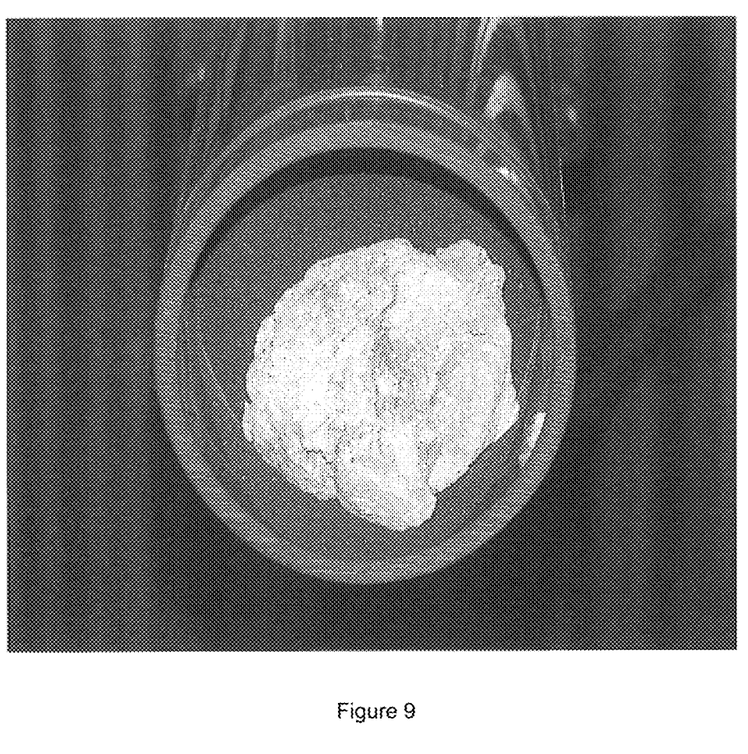
FIG. 9 shows a large concrete chunk that passed through an L-valve, sitting at the end of the horizontal section of the L-valve.

Often the solids discharge from gasifiers can contain large agglomerates. A question that was asked is: can the L-valve discharge these large agglomerates? To answer this question, a test was set up to determine if an L-valve could pass large, agglomerated material. A schematic drawing of the equipment used in this testing is shown in FIG. 8. A 4-in (10-cm)-diameter L-valve was attached to the bottom of the coke feed hopper of the test unit. A wye section was then added to the top of the L-valve standpipe so that agglomerate lumps could be added to the standpipe to see if they would pass through the L-valve. The horizontal section of the L-valve was 24 inches (0.6 m) in length. A 90-degree elbow at the end of the L-valve horizontal section allowed the solids to discharge into a drum. A screen was placed on top of the drum to catch any agglomerates that passed through the L-valve. The Group B Flexicoke material was used in the testing.

To test the ability of the L-valve to transfer large lumps, 3 golf balls were added to the L-valve. The golf balls easily passed through the L-valve at a relatively low solids flow rate. Because of the relative ease at which the golf balls passed through the L-valve, two concrete chunks were then added to the top of the L-valve standpipe to see if they could be passed through the L-valve. The larger of the two concrete chunks was 3 in×2.75 in×2 in (7.6 cm×7 cm×5.1 cm). Both concrete chunks passed through the L-valve, but the solids flow rate had to be somewhat higher in order for the concrete chunks to be discharged from the L-valve. A solids velocity of approximately 0.33 ft/s (0.1 m/s) was required to pass the concrete chunks through the L-valve. This corresponded to a solids flux of 18 lb/s-ft$^2$ (90 kg/s-m$^2$). A picture of one of the concrete chunks at the end of the L-valve horizontal section after it has passed through the L-valve is shown in FIG. 10. The results of this testing showed that large, heavy agglomerate chunks could be passed through the L-valve.

The L-valve has the following advantages over the dilute-phase venturi configuration in discharging non-agglomerating solids:

1) The L-valve size can be accurately designed for a particular solids flow rate. The venturi configuration cannot be designed reliably at this time because of a lack of a design correlation.

2) There will be fewer adjustments of the jet and distributor gas flow rates. With the venturi configuration, changing the solids discharge rate necessitates a corresponding change in the jet gas flow and/or the distributor flow rate. This would not be required with an L-valve because the "venturi" gas flow would not have to be changed to change the solids discharge rate.

3) The "venturi" or bottom gas can be a lower velocity to prevent excessive erosion of the jet pipe and the venturi surfaces.

4) Using an L-valve allows the interstitial gas in the solids to be stripped—preventing gases from the fluidized bed from being discharged with the solids. This cannot be accomplished with a dilute-phase discharge system.

Therefore, the L-valve can be used in place of the venturi for controlling the discharge from SES gasifiers.

All publications and patents mentioned in the above specification are herein incorporated by reference in their entirety for all purposes. Although the technology has been described in connection with specific exemplary embodiments, it should be understood that the invention as claimed should not be unduly limited to such specific embodiments. Various modifications of the described embodiments for carrying out the invention, apparent to those skilled in the relevant fields, are intended to be within the scope of the following claims.

What is claimed is:

1. A fluidized bed gasification system which comprises a fluidized bed gasification reactor having a bottom ash discharge outlet below the reactor, wherein an L-valve is used to control the rate of bottom ash discharge, the system comprising:
   i. an L-valve located downstream of and connected to the bottom ash discharge outlet for controlling the solids flow rate, wherein the L-valve comprises: an inlet pipe having a first diameter $D_I$ and having an inlet pipe end; an outlet pipe having a second diameter $D_O$ that is between 50% and 75% of the first diameter, and oriented at a valve angle between 45 degrees and 135 degrees relative to the inlet pipe, where the outlet pipe has an outlet pipe end and the inlet pipe has a proximate side that is on the same side as the outlet pipe end and a distal side that is opposite the outlet pipe end, and where the outlet pipe end is aligned with the proximate side; and
   ii. an aeration fluid inlet conduit for carrying aeration fluid into the inlet and wherein the opening of the aeration fluid inlet conduit is located on distal side of the inlet pipe at a location that is above the center line of the outlet pipe by a distance H, wherein the $H/D_I$ ratio is between the range of about 1-3.

2. The system of claim 1, further comprising a cooling device into which the solids are discharged from the outlet pipe.

3. The system of claim 1, further comprising an ash cooling vessel located between the ash discharge outlet of the fluidized gas reactor and the inlet pipe of the L-valve.

4. The system of claim 1, further comprising a means for fluidizing the ash particles discharged from the bottom ash discharge outlet of the fluidized gas reactor wherein gas from the reactor is stripped from the ash particles with a stripping gas.

5. The system of claim 4, wherein the means for fluidizing the ash particles comprises a transition region or conical region where a wider downcomer of the bottom ash discharge outlet is transitioned into a narrower inlet pipe of the L-valve.

6. The system of claim 4, further comprising a differential pressure control means (DP-3) for measuring and controlling the pressure differential the transition region or conical region, and a point in the bottom ash discharge outlet near the point where venturi steam enters the discharge outlet, wherein operation of the stripping fluidized bed above the L-valve inlet pipe is monitored.

7. The system of claim 1, wherein the $H/D_I$ ratio is about 1.5-2.5.

8. The system of claim 7, wherein the $H/D_I$ ratio is about 1.5-2.

9. The system of claim 1, wherein the aeration fluid is steam, $CO_2$, or $N_2$, or a suitable mixture thereof.

10. The system of claim 1, wherein the valve angle is about 90 degree.

11. The system of claim 5, further comprising a first differential pressure control means (DPT1) for measuring pressure differential between the aeration fluid inlet conduit and a location where the stripping gas is added in the transition region or conical region.

12. The system of claim 10, further comprising a second differential pressure control means (DPT2) to measure the pressure drop between the aeration fluid inlet conduit and a point in the L-valve outlet pipe.

13. The system of claim 1, further comprises a differential pressure control means to measure and control pressure across the horizontal section.

14. A method for managing bottom ash discharge rate of a fluidized bed gasification reactor, wherein the system of claim 1 is used and wherein bottom ash discharge rate is controlled by controlling the amount of aeration fluid inputted to the L-valve.

15. A method for controlling the height of the fluidized bed inside the fluidized bed reactor of the system of claim 1, wherein when the bed height drops below a desired value, the controller sends a signal to an L-valve aeration control valve to close slightly in order to reduce the discharge rate through the L-valve; and wherein when the bed height increases above a desired bed height, the controller will send a signal to the L-valve aeration control valve to open to increase the aeration to the L-valve so that more solids will be discharged.

* * * * *